US009020033B2

(12) United States Patent
Shmueli et al.

(10) Patent No.: US 9,020,033 B2
(45) Date of Patent: Apr. 28, 2015

(54) SYSTEM AND METHOD FOR ENHANCING COMPRESSION USING SKIP MACRO BLOCK ON A COMPRESSED VIDEO

(75) Inventors: Yaron Shmueli, Kfar-Saba (IL); Eran Gonen, Ra'anana (IL)

(73) Assignee: Nice-Systems Ltd., Ra'Anana (IL)

(*) Notice: Subject to any disclaimer, the term of this patent is extended or adjusted under 35 U.S.C. 154(b) by 650 days.

(21) Appl. No.: 12/939,728

(22) Filed: Nov. 4, 2010

(65) Prior Publication Data
US 2012/0114040 A1 May 10, 2012

(51) Int. Cl.
H04N 19/40 (2014.01)
H04N 19/109 (2014.01)
H04N 19/139 (2014.01)
H04N 19/159 (2014.01)
H04N 19/176 (2014.01)
H04N 19/134 (2014.01)
H04N 19/132 (2014.01)
H04N 19/48 (2014.01)
H04N 19/513 (2014.01)

(52) U.S. Cl.
CPC .............. *H04N 19/40* (2014.11); *H04N 19/109* (2014.11); *H04N 19/513* (2014.11); *H04N 19/139* (2014.11); *H04N 19/159* (2014.11); *H04N 19/176* (2014.11); *H04N 19/134* (2014.11); *H04N 19/132* (2014.11); *H04N 19/48* (2014.11)

(58) Field of Classification Search
CPC ... H04N 19/40; H04N 19/109; H04N 19/139; H04N 19/176; H04N 19/513
USPC .......................... 375/240.27, 240.29, 240.25
See application file for complete search history.

(56) References Cited

U.S. PATENT DOCUMENTS

| 5,455,629 | A | * | 10/1995 | Sun et al. ................. 375/240.27 |
| 5,509,089 | A | * | 4/1996 | Ghoshal ........................ 382/236 |
| 6,704,363 | B1 | * | 3/2004 | Kim .......................... 375/240.27 |
| 6,862,320 | B1 | * | 3/2005 | Isu et al. .................... 375/240.27 |
| 7,173,971 | B2 | * | 2/2007 | Amara et al. ............. 375/240.27 |
| 7,742,529 | B1 | * | 6/2010 | Ghanbari ................. 375/240.27 |
| 2003/0112366 | A1 | * | 6/2003 | Baylon et al. ............... 348/441 |
| 2003/0219073 | A1 | * | 11/2003 | Lee et al. ................. 375/240.27 |
| 2004/0102403 | A1 | * | 5/2004 | Bennett et al. .................. 514/44 |

(Continued)

OTHER PUBLICATIONS

ITU-T Recommendation H.263 (Jan. 2005).*
J.M. M Theisse, J. Jung, & M. Antonini, "Hybrid-1D Macroblock Prediction for Video Compression", 2 Proc. of the 2009 WRI World Congress on Software Engineering (WCSE '09) 185-188 (Aug. 2009).*

(Continued)

*Primary Examiner* — Dave Czekaj
*Assistant Examiner* — David N Werner
(74) *Attorney, Agent, or Firm* — Pearl Cohen Zedek Latzer Baratz LLP

(57) ABSTRACT

A method, apparatus and a computer readable medium for skipping macro blocks of a compressed video. The method includes, for at least one INTER frame, saving a set of macro blocks including at least one of a macro block having a motion vector greater than a predetermined motion vector threshold, a macro block having positional correspondence to at least one macro block having a motion vector, a macro block having a size greater than a predetermined macro block size threshold, and a macro block having positional correspondence to a second macro block in a previous group of pictures, the second macro block having a motion vector. The method deletes and marks as skipped one or more remaining macro blocks, and merges the set in an order to create a compressed frame including a skipped macro block. The processor implements the method, and the computer readable medium contains processor instructions.

15 Claims, 9 Drawing Sheets

(56) References Cited

U.S. PATENT DOCUMENTS

| | | | |
|---|---|---|---|
| 2005/0013496 A1* | 1/2005 | Bruls et al. | 382/239 |
| 2005/0169377 A1* | 8/2005 | Lin et al. | 375/240.16 |
| 2005/0201463 A1* | 9/2005 | Lee et al. | 375/240.16 |
| 2006/0133500 A1* | 6/2006 | Lee et al. | 375/240.16 |
| 2006/0133502 A1* | 6/2006 | Lee et al. | 375/240.16 |
| 2006/0140274 A1* | 6/2006 | Lu et al. | 375/240.16 |
| 2007/0019727 A1* | 1/2007 | Koto et al. | 375/240.12 |
| 2007/0263087 A1* | 11/2007 | Hong et al. | 348/14.13 |
| 2008/0212680 A1* | 9/2008 | Rault | 375/240.16 |
| 2010/0104022 A1* | 4/2010 | Chatterjee et al. | 375/240.24 |
| 2010/0300834 A1* | 12/2010 | Yokoo et al. | 198/346.2 |

OTHER PUBLICATIONS

H.K. Arachchi, S. Dogan, H. Unzer, & A.M. Kondoz, "Utilizing Macroblock SKIP Mode Information to Accelerate Cropping of an H.264/AVC Encoded Video Sequence for User Centric Content Adaptation" (Nov. 2007).*

Y.K. Lee, S.S. Lee, & Y.L. Lee, "MPEG-4 to H.264 Transcoding using Macroblock Statistics", 2006 IEEE Int'l Conf. on Multimedia and Expo 57-60 (Jul. 2006).*

B.G. Kim & S.K. Song, "Enhanced Inter Mode Decision Based on Contextual Prediction for P-Slices in H.264/AVC Video Coding", 28 ETRI J. 425-434 (Aug. 2006).*

* cited by examiner

SYSTEM AND METHOD FOR ENHANCING COMPRESSION USING SKIP MACRO BLOCK ON A COMPRESSED VIDEO

FIELD OF THE INVENTION

The present invention relates to video compression and, in particular, to a system and method for enhancing compression using skip macro block on a compressed video data stream.

BACKGROUND

The basic structure of advanced video compression standards may divide the video frames into two main types of frames: independent frames, also known as INTRA frames (or I-frames) and dependent frames, also known as INTER frames (or predicted (P) and/or bidirectionally predicted (B) frames).

INTER frames may be smaller than INTRA frames because they are compressed with respect to other frames. INTER frames may be expressed in terms of or in relation to one or more neighboring frames, and may contain only the difference between the current motion compensated frame and a reference frame.

Each INTER frame may be divided into smaller segments, which are called macro blocks (MB). In the encoding process, the encoder may search for similar MBs in the reference frame. The spatial displacement between the location of the MB in the current frame and the location of the most similar segment in the reference frame is called a motion vector (MV). Each encoded MB may be built out of two main parts: the MV, and the difference from the reference segment.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
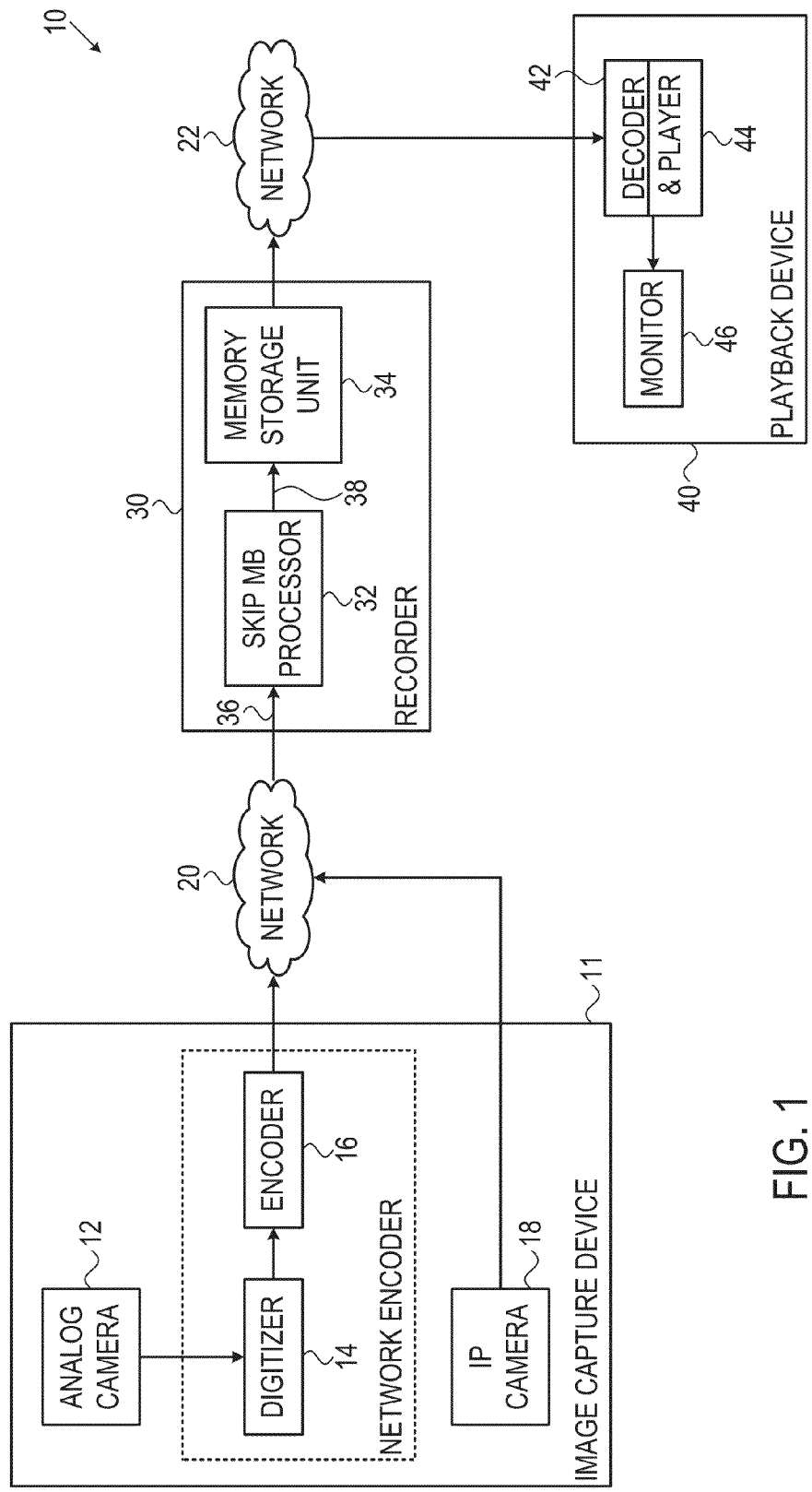
FIG. 1 schematically illustrates a system in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DEFINITION OF TERMS

The terms used in this specification generally have their ordinary meanings in the art, within the context of the invention, and in the specific context where each term is used. Certain terms are discussed below, or elsewhere in the specification, to provide additional guidance to the practitioner in describing the devices and methods in accordance with embodiment(s) of the invention and how to make and use them. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to the preferred embodiments.

"Playback device" means an appliance that is capable of receiving, rendering, and optionally transmitting audio, video, or audiovisual data, including digital media.

"Image," "video," and the like, mean any information in any analog or digital format (either in the compressed or expanded domain) which can be displayed, rendered or perceived in sight and/or sound, with or without any other accompanying information that is "hidden," i.e., not displayed, rendered or perceived. For example, motion action, still action, and/or a series, or sequences, of still action.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A system and a method in accordance with embodiments of the invention may analyze a compressed video stream in real-time and may reduce the size of the compressed video stream by replacing static and low importance blocks with a "skipped" marking in the compressed stream. This may result in storage and bandwidth savings with a substantially unnoticeable or negligible loss in video quality.

For example, video surveillance scenes may be static with a low percentage of moving objects. The higher the resolution, the higher the number of blocks that can be transformed to skipped blocks resulting in a reduced stream size. To avoid missing small changes between consecutive frames, a method in accordance with an embodiment of the invention may generate an interest bitmap, e.g., both spatially and temporally, for a group of pictures (GOP). The method can be utilized in a video recorder, a network infrastructure, or on a capturing device, at a network video encoder or at an IP video camera.

In order to reduce the bit rate, an encoder may choose to discard information from static areas of the frame. The encoder may do this by marking the MB as "skipped." This decision may be based on a small or about zero MV, e.g., less than a predetermined motion vector threshold, and a very small difference from the reference segment. In the skipped areas, the image may not change, thereby maintaining the information from a previous frame. The distortion from skipping a MB can go unnoticed in static areas of the scene. A motion vector may show a displacement within a MB between the current video frame and a reference video frame (either a previous or future frame). The resolution of the motion vector may be in quarter pixels. In one implementation the motion vector threshold may be about a half-pixel hypotenuse to distinguish between noise and actual motion (e.g., a motion vector threshold about 0.5).

A real time encoder may determine whether to skip a MB based on information from at least two frames: the current frame and the reference frame. In the event the decision is wrong, the encoder may have to encode the accumulated difference in the next frame. An encoder may not use this option often and might refresh static background MB every few frames.

A method in accordance with an embodiment of the invention may reduce the bit rate of compressed video in real time, by replacing an encoded MB with a skipped MB. The method can skip a MB based on an analysis of the MV and its difference from a reference segment over long periods of time. The method may result in video data having an unnoticeable reduction in quality, which may be limited to areas of the scene with no motion. Because the method may analyze and edit the video in the compressed domain, it may use limited resources (e.g., time, memory, overhead, etc.).

FIG. 1 schematically illustrates system 10 in accordance with an embodiment of the invention. System 10 may be configured to capture images, encode the images, and transmit a compressed video stream across a network to a recorder that may be configured to implement the skip MB method in accordance with an embodiment of the invention. The recorder may be configured to transmit the skipped MB compressed video across a network (either the same or different network) to an image playback station.

As shown in FIG. 1, the video images may be captured by image capture device 11. The image capture device may be analog camera 12 and/or Internet protocol (IP) camera 18. The analog signal from analog camera 12 is provided to digitizer 14. The digitized video output of digitizer 14 may be provided to encoder 16, which may be a network video encoder. IP camera 18 may include a network video encoder, which encodes the video internal to the IP camera. Encoder 16 and/or the internal encoder of IP camera 18 may be real time encoders and each may produce an encoded digital video image.

Encoder 16 and/or IP camera 18 may be in communication with network device 20. Network device 20 may support an electronic communication network (e.g., Internet, local area network, wide area network, virtual private network, etc.). The encoded video from either encoder 16 or IP camera 18 may be streamed via network 20 to recorder 30. The recorder may store the transmitted video from encoder 16 or IP camera 18 in memory storage unit 34.

Recorder 30 may include skip MB processor 32 and may also include memory storage unit 34. Skip MB processor 32 may perform the skip MB process in accordance with an embodiment of the invention on the encoded digital compressed video. As mentioned above, the skip MB process may further reduce the size of the input compressed video. The skipped MB compressed video may be stored in memory storage unit 34. When a video is to be viewed, the recorder may extract the skip MB compressed encoded digital image from memory storage unit 34 and transmits the skip MB compressed encoded digital image via network device 22 to playback device 40.

Figure 8:
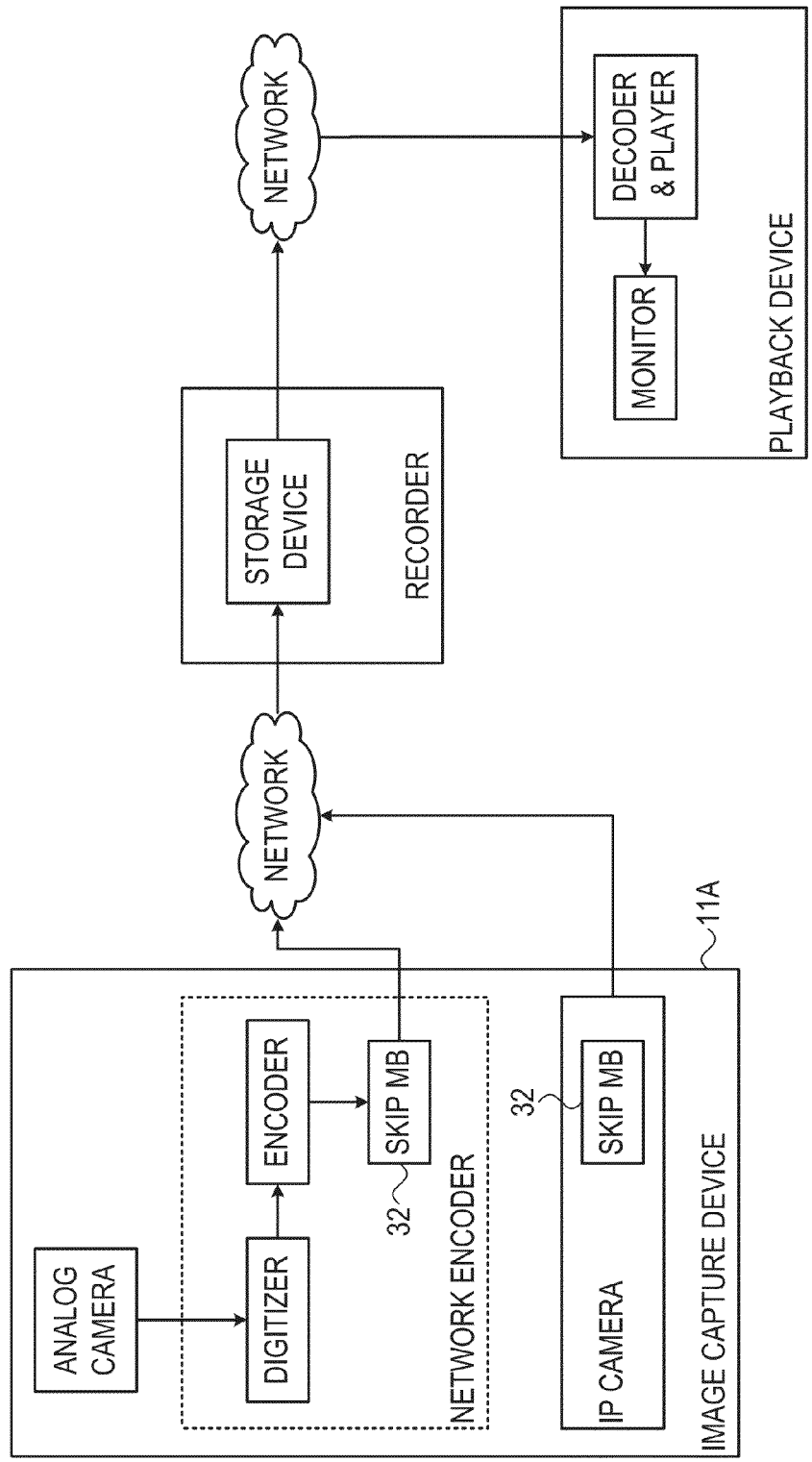
FIG. 8 schematically illustrates a system in accordance with an embodiment of the invention.
Figure 9:
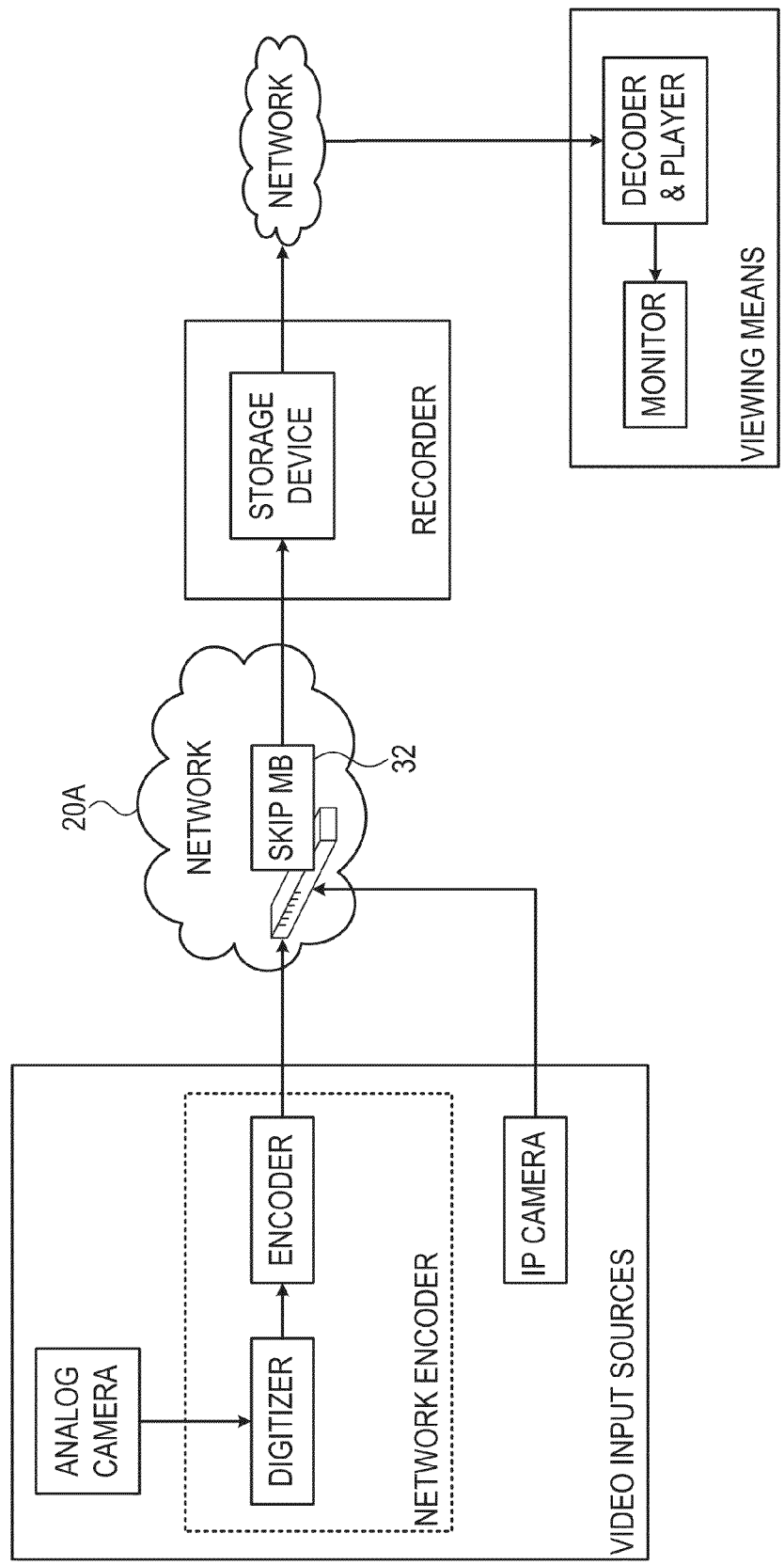
FIG. 9 schematically illustrates a system in accordance with an embodiment of the invention.

In other implementations, skip MB processor 32 may be located at image capture device 11A (FIG. 8). In this implementation, the streaming between the recorder and the input devices may require significantly lower bandwidth. In an alternative implementation, skip MB processor 32 may be located at network device 20A (FIG. 9). In this implementation, the streaming to the recorder may require significantly lower bandwidth.

In other implementations, memory storage unit 34 may be remotely located from, and in electronic communication with, recorder 30. The recorded need not be the only device in system 10 that can access the video stored within memory storage unit 34. For example, playback device 40 may be in electronic communication with the memory storage unit via network 22. Although FIG. 1 depicts network device 20 and network device 22 as different network devices, in one implementation there may be one network device supporting one electronic communication network interconnecting the image capture device, recorder, playback device, and memory storage units.

Playback device 40 may include decoder 42, player 44, and monitor 46. Decoder 46 decodes the compressed encoded digital image stream provided via network 22. Player 44 may playback the decoded video stream and may provide the video to monitor 46 so that it may be viewed by a user.

The skip MB process in accordance with an embodiment of the invention may maintain the compatibility of the skipped MB compressed stream to a video standard, and can be applied to video standards such as MPEG2, MPEG4, H.264, etc.

The skip MB process in accordance with an embodiment of the present invention may be an internal process in recorder 30, which may perform the skip MB compression before the video stream is stored in memory storage unit 34. A macro block may be the smallest element in the compressed video's bit stream that has a header. The number of blocks in a MB may vary based on the video content and the compression standard applied by the encoder located upstream to recorder 30. The skip MB process in accordance with an embodiment of the present invention may decide which MB to keep and which MB to skip or delete from the stream.

Figure 2:
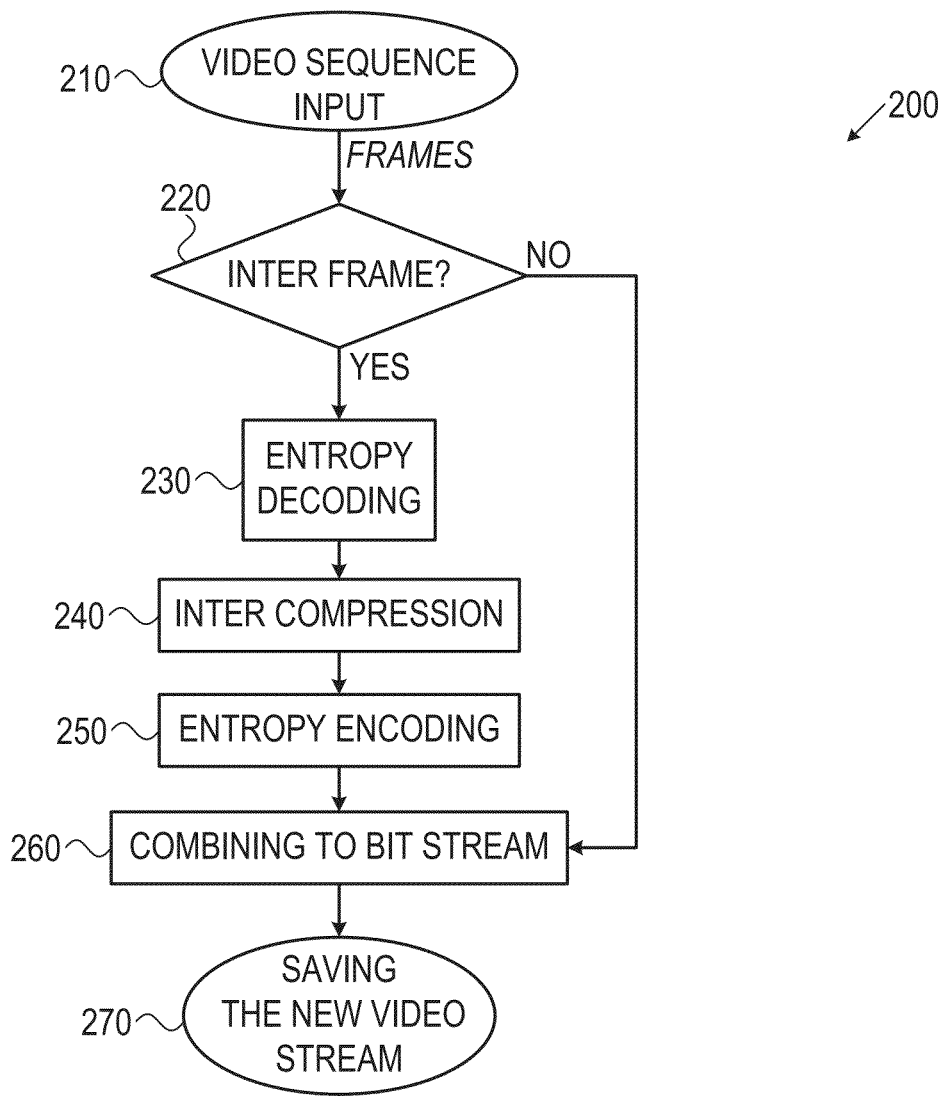
FIG. 2 illustrates a process in accordance with an embodiment of the invention.

FIG. 2 illustrates process 200 that produces a compressed video stream in accordance with an embodiment of the invention. Process 200 may be performed by recorder 30; in particular by skip MB processor 32. A coded video sequence may be provided as input, step 210, to the recorder. This input may be a compressed video stream done in accordance with a video standard. A decision may be made as to whether a frame is an INTER frame, step 220. If the frame is not an INTER frame, the frame may be combined, step 260, to the bit stream output. The bit stream output may be saved, step 270, as part of the skipped MB compressed video stream.

If the frame is an INTER frame, then process 200 may continue at step 230. At step 230, entropy decoding may be performed on the INTER frame. The entropy decoding process may be implemented in hardware, software, or a combination of hardware and software. Entropy decoding may include variable length decoding, binary arithmetic decoding, etc. and may be performed to reverse the entropy encoding (e.g., variable length coding, binary arithmetic encoding, etc.) done when the video was encoded. The entropy decoding process may reveal the motion vector and may also reveal the size of each macro block.

After the INTER frame has been decoded, the frame may undergo INTER compression, step 240. INTER compression is described below with reference to FIG. 3.

After INTER compression has been performed on the INTER frame, entropy encoding may be performed, step 250, on the INTER frame. The entropy-encoded INTER frame may then be combined, step 260, with the untouched INTRA frames into a bit stream output. The bit stream output may be saved in a storage medium, step 270, as part of the skipped MB compressed video stream.

Figure 3:
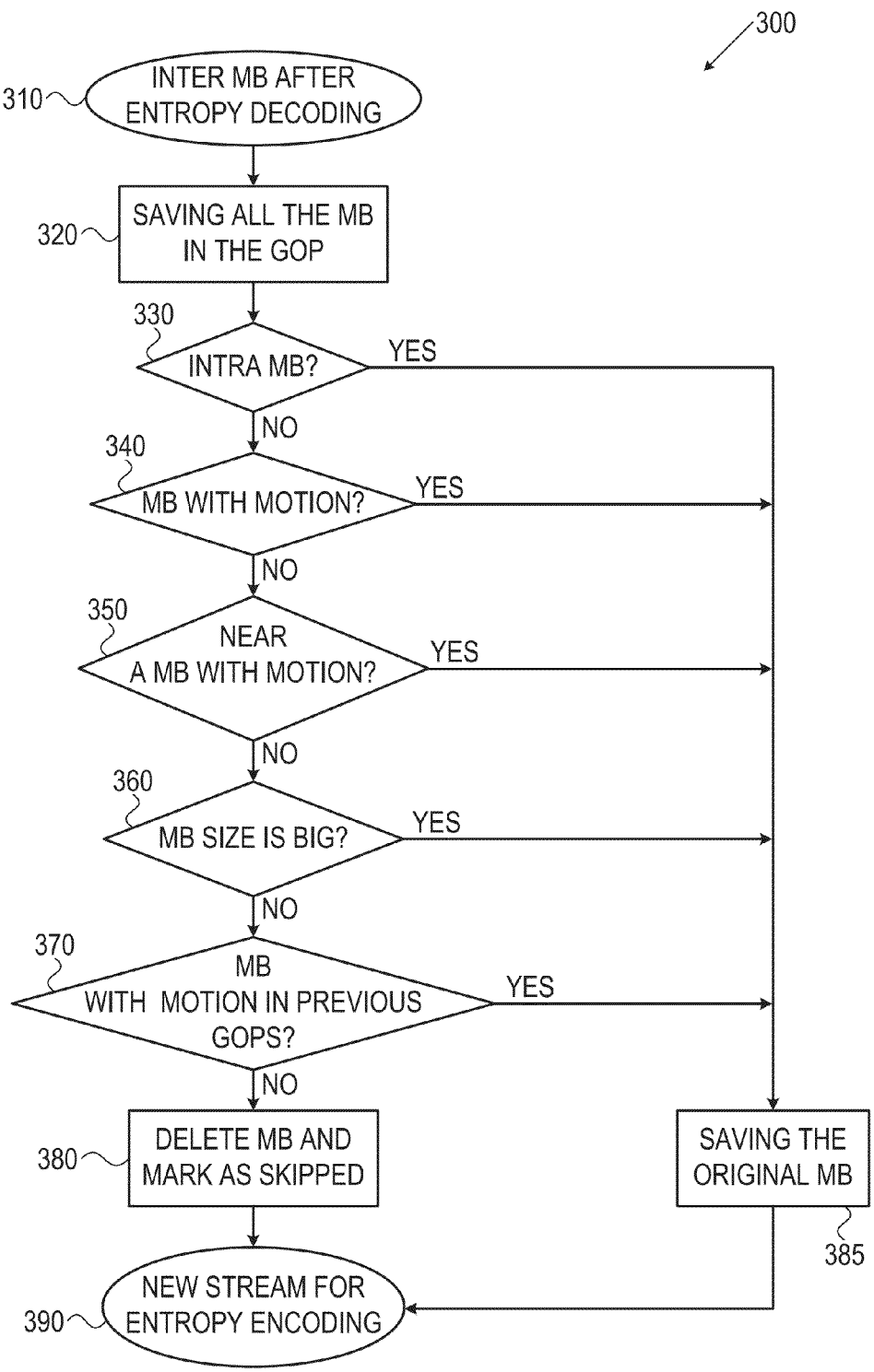
FIG. 3 illustrates a process in accordance with an embodiment of the invention.

FIG. 3 illustrates process 300 in accordance with an embodiment of the invention. Process 300, which may be performed by recorder 30 and more particularly skip MB processor 32, performs INTER compression (FIG. 2, step 240) on the decoded INTER frame. Process 300 may begin the INTER compression process by receiving, step 310, an INTER frame MB after undergoing entropy decoding.

All the MB within a group of pictures (GOP) may be saved, step 320, in a memory unit accessible by the skip MB processor. Because a skip MB process in accordance with an embodiment of the invention may be done on an INTER frame, any INTRA MB within the decoded INTER frame may be separated, step 330.

The INTRA MB may exist in one or more INTER frames to track high differences compared to a previous frame and/or to avoid the extra overhead of INTRA frames by embedding an INTRA MB within an INTER frame. This process may require reading the MB header in order to resolve its type. An INTRA macro block is an anchor MB, and may be defined as those macro blocks in an INTER frame that are fully-specified—e.g., not defined with reference to another frame. Those MBs that are INTRA MBs may be saved, step 385, and then may be merged with any skipped MBs to form a new compressed frame, step 390.

Figure 4:
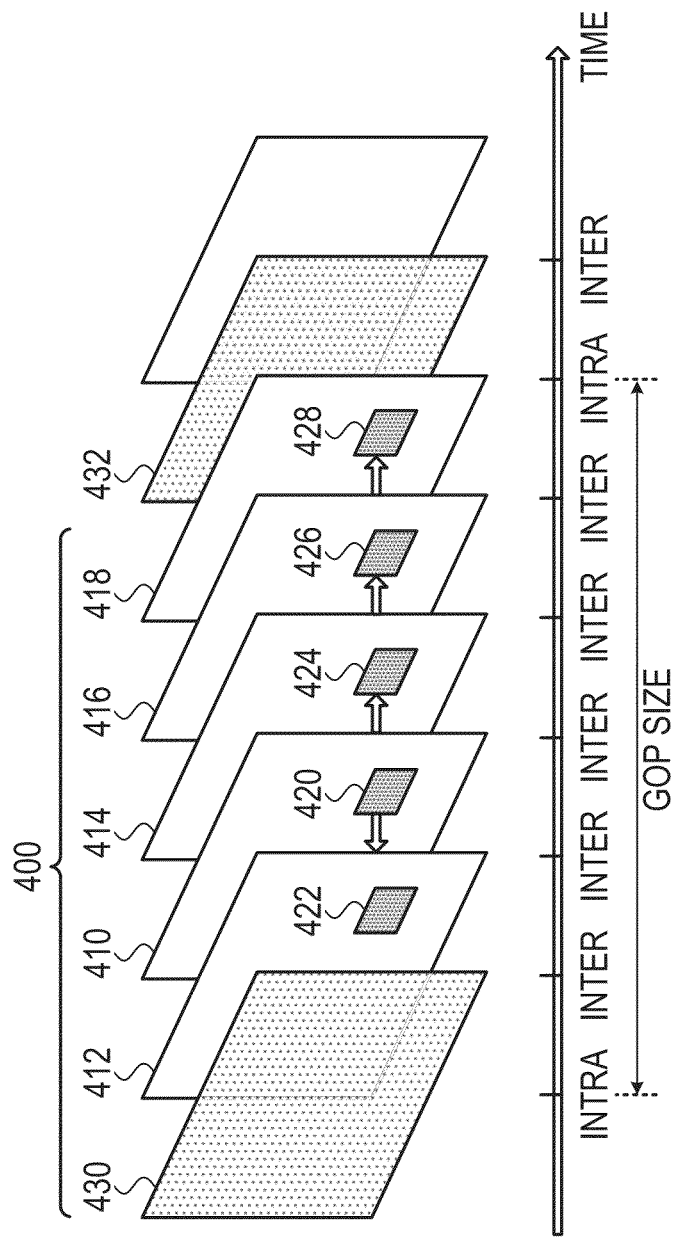
FIG. 4 illustrates a group of pictures in accordance with an embodiment of the invention.

FIG. 4 illustrates GOP 400 in accordance with an embodiment of the invention. GOP 400 may include frames 410-418. Within frames 410-418 may be MBs 420-428. MBs 420-428 each may have positional correspondence to one another, in that they may each be located in the same motion compensated location within their respective frame (i.e., relative spatial position to a previous and/or a future frame). Frame 410 may include a MB 420 that may be an area-of-interest having motion. The area-of-interest of MB 420 may affect other positional corresponding MBs 422-428 in frames 412-418. The MB bitmaps for frames 422-428 may create a uniform area-of interest for all the frames in the GOP. Accordingly, in accordance with an embodiment of the invention, all the coded MBs 422-428 may be saved in frames 410-418 and not skipped during INTER compression process 300.

A GOP may be a sequence of frames between two consecutive INTRA frames. Process 300 may be applied to a full GOP. For example, if a MB in the GOP is a MB with motion, all the positional corresponding MBs in the rest of the frames within the same GOP may also be considered to have motion.

Figure 5:
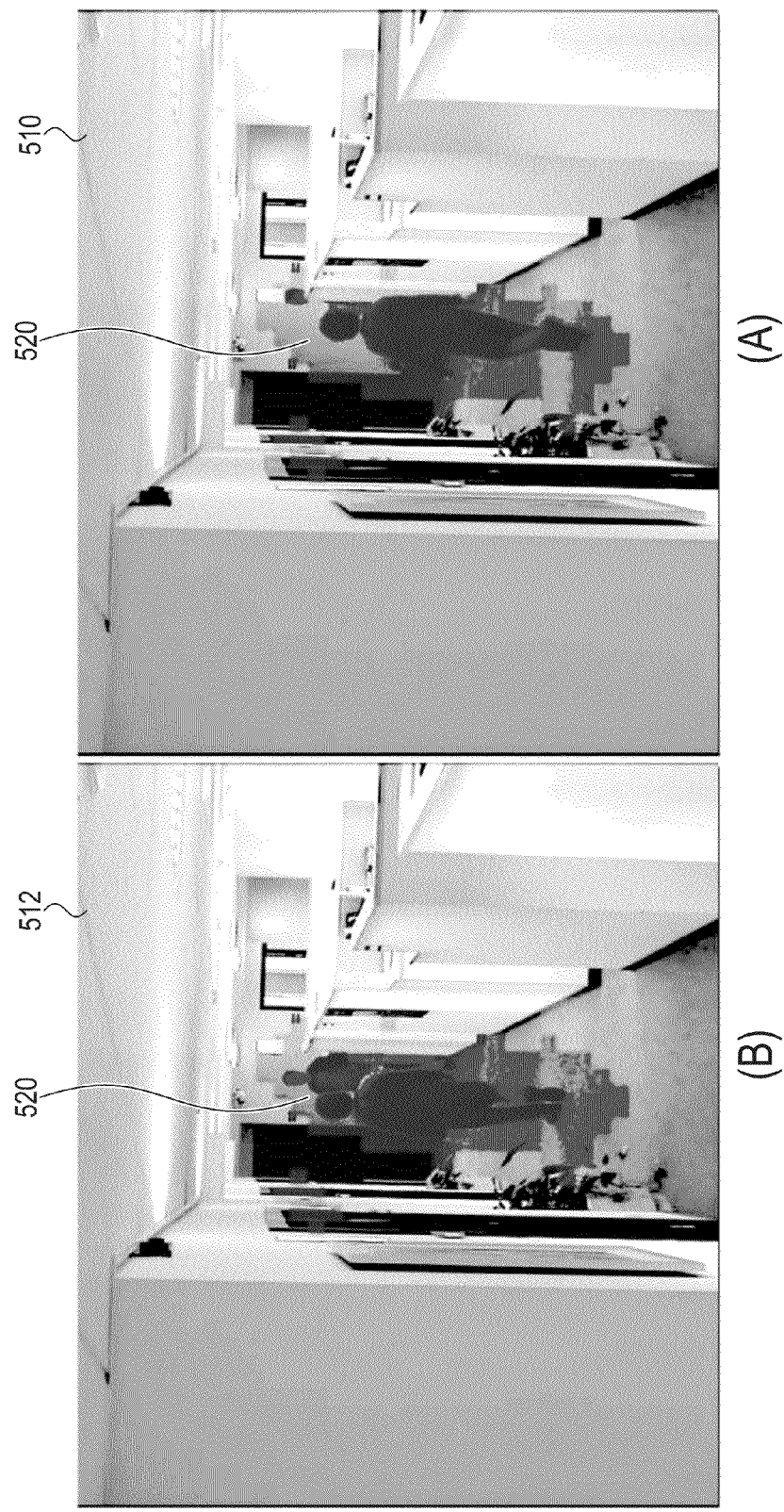
FIGS. 5A-5B illustrate two frames from a group of pictures in accordance with an embodiment of the invention.

FIGS. 5A-5B illustrate frames 510, 512 from a group of pictures in accordance with an embodiment of the invention. Within frame 510 may be an area-of-interest 520 having two objects moving inside the area-of-interest—i.e., two individuals approaching along the same corridor. Frame 512 may depict the same, or similar, area-of-interest 520 where the two objects' positions have moved within the area-of-interest—i.e., the two individuals have gotten closer in the corridor.

With reference again to FIG. 3, a determination may be made, step 340, as to whether an INTER MB under consideration has motion. If there is motion, the INTER MB may be saved, step 385, and then may be merged with any skipped MB frames to form a new stream, step 390.

A MB may be treated as a MB with motion if the MB has a MV greater than a predetermined threshold, or if the MB is coded as an INTRA MB. In accordance with an embodiment of the invention, the MV predetermined threshold may be about zero.

If there is no motion within the INTER MB, process 300 continues to step 350 where a decision is made as to whether the INTER MB under consideration is near a MB with motion (e.g., a MB to the right, left, up, and/or down or diagonally (upper-right, upper-left, lower-right, lower-left) in a motion bit-map that may be generated per GOP). If so, the INTER MB may be saved, step 385, and then may be merged with any skipped MBs to form a new compressed frame, step 390.

After step 350, process 300 may continue at step 360, where a determination may be made as to whether the INTER MB under consideration is large. A large-sized MB may be treated as an MB with motion. A MB may be considered to be a large-sized MB if it is greater than a predetermined MB bit size threshold.

The MB bit size is a compression result and may be related to the difference of a MB compared to a MB from a previous frame in combination with a motion estimation performed by the encoder. For example, if there is no MV compared to a previous MB there may still be a difference in pixel values which may be encoded. If the size (in bits) of the resultant MB is not greater than a predetermined threshold, the MB may be potentially skipped. In one embodiment in accordance with the invention, the MB bit size threshold may be about 0 bits, about 100 bits, about 400 bits, about 500 bits, or about 1,000 bits. The MB bit size threshold may be representative of the skip MB compression strength (e.g., a zero threshold may mean no skip MB compression, and a threshold of 500 may mean a stronger skip MB compression strength). If the MB size is greater than the predetermined MB size threshold, the INTER MB may be saved, step 385, and then may be merged with any skipped MBs to form a new compressed frame, step 390.

Figure 6:
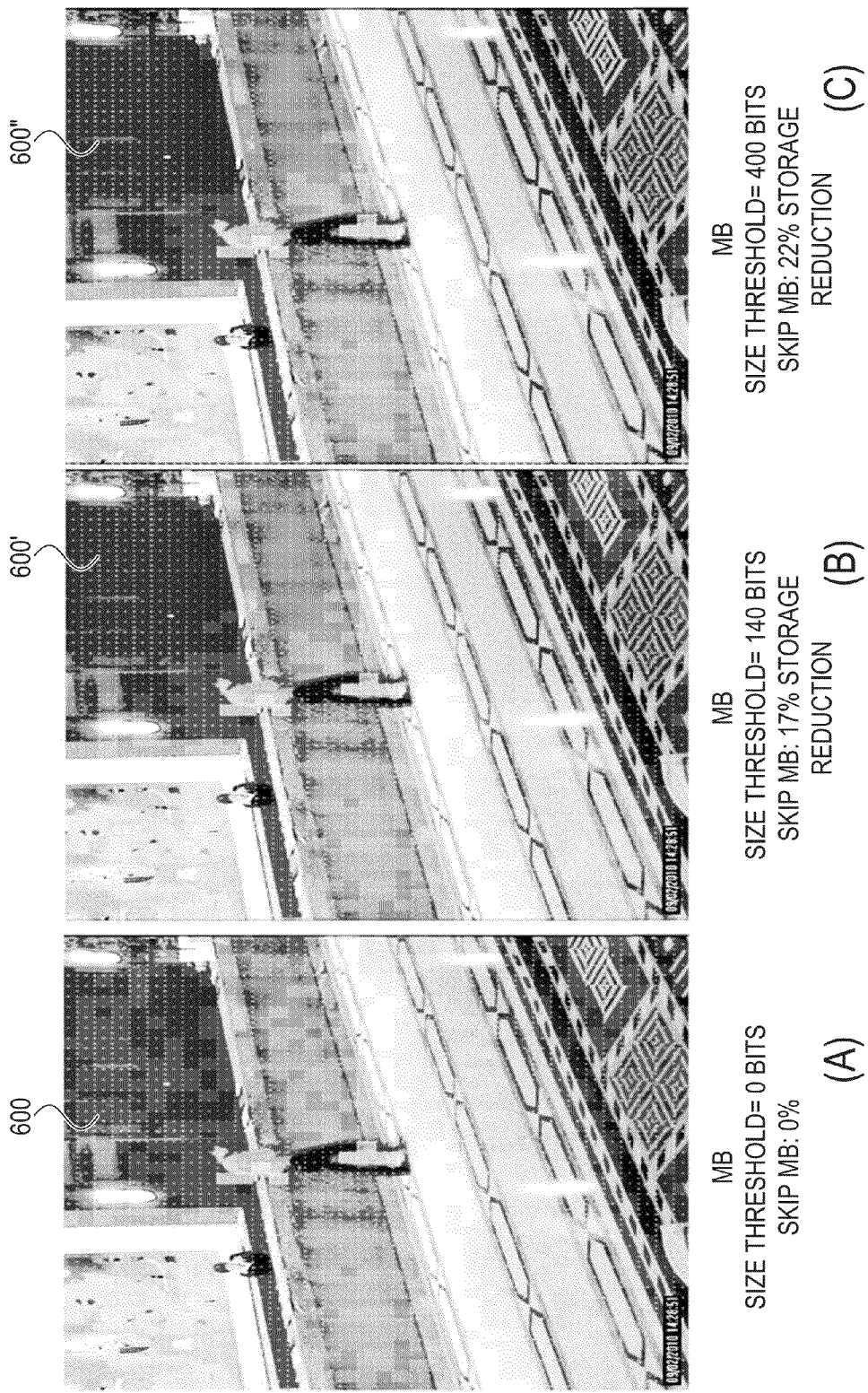
FIGS. 6A-6C illustrate two frames having the same image content in accordance with an embodiment of the invention.

FIGS. 6A-6C illustrate frames 600, 600', 600", where each of frame 600, 600', 600' is the same image but produced using different size thresholds in step 360 in accordance with an embodiment of the invention. Marked areas 610 in FIGS. 6A-6C are coded MB (e.g., not skipped MBs) while the unmarked areas are skipped MB. For instance, the areas around the counter where the desk clerk and patron appear are not skipped MB, while the floor and walls in other portions of frames 600, 600', 600" are skipped MB. By increasing the MB size threshold, more of images 600, 600', and 600" may undergo the skip MB process in accordance with an embodiment of the invention. Because the large-sized MBs are not processed, the overall image is not impacted.

With reference again to FIG. 3, process 300 may continue at step 370, where a determination may be made as to whether the current INTER MB under consideration follows a previous GOP with motion in a positional corresponding MB. If a positional corresponding MB was treated as a MB with motion in previous GOPs it may also be treated as a MB with motion in the current GOP. By applying this criterion, small moving objects in an area-of-interest may be kept in the image, even in a GOP where the small object's motion was too little to create a MV. The number of GOPs for which the skip MB process in accordance with an embodiment of the invention may "save" a motion may be a predetermined parameter provided to the process.

If the INTER MB under consideration follows a previous GOP with motion in its MB, the INTER MB may be saved, step 385, and then may be merged with any skipped MBs to form a new compressed frame, step 390.

In one implementation, the INTER MB under consideration may be saved if it has positional correspondence with a MB in a previous GOP which satisfies at least one of the conditions of steps 340, 350, and 360.

Figure 7:
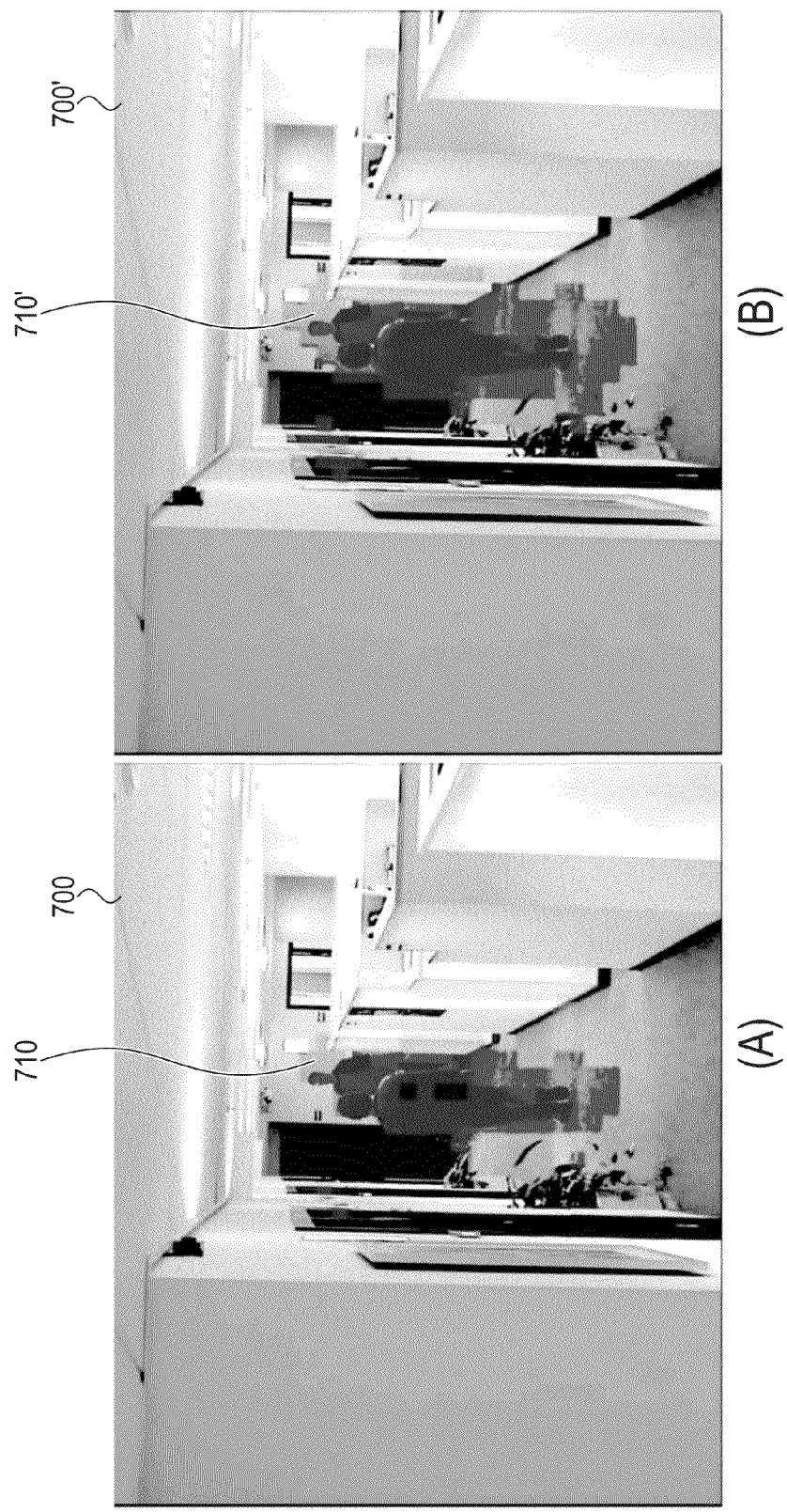
FIGS. 7A-7B illustrate two frames having the same image content in accordance with an embodiment of the invention.

A morphological dilation operation may also be applied to extend an area marked as including motion. A dilation operation may use a structuring element for probing and expanding the shapes contained in the input image. FIGS. 7A-7B illustrate frame 700, 700', where the same image is displayed, but produced without (FIG. 7A) and with (FIG. 7B) morphological dilation. As shown in FIG. 7A, area-of-interest 710 (e.g., the area marked as including motion) without the dilation may not be as complete as the area-of-interest 710' shown in FIG. 7B. Because there was no morphological dilation operation, area-of-interest 710 may fail to include part of the moving objects.

With reference to FIG. 3, at step 380, the INTER MB under consideration may be deleted and marked as skipped in the bit stream. A new stream may be assembled, step 390, from any INTRA MBs and INTER MBs that may have been saved at step 385. This new compressed frame may be provided to process 200 to undergo entropy encoding, step 250 (FIG. 2), as described above.

The skip MB process in accordance with an embodiment of the invention may be a low resources process that could reduce storage requirement for a large facility with multiple surveillance cameras. The storage reduction percentage may be a factor of the compression standard, the GOP size, the content of the video scene, and the bit rate and/or the resolution of the entropy encoding stage. The process may have low CPU usage because it works on the frames in their compressed form.

Tables I and II illustrate the saving percentage measured for a variety of commercially available surveillance IP camera systems after their video streams for a variety of images underwent the skip MB process in accordance with an embodiment of the invention. As shown in Tables I and II, a reduction in storage requirement of up to 50% may be achieved.

TABLE I

| Image: | Parking1 | NICE Yard | Parking2 | Casino |
|---|---|---|---|---|
| Vendor/model: | Arecont 2105 | Panasonic 502 | AXIS Q7401 | NICE NVE1008 |
| Resolution: | 2 MP | 1 MP | 4 CIF | 4 CIF |
| Saving (percent): | 42% | 25% | 9% | 12% |

TABLE II

| Image: | Junction | Avenue | Parking night | NICE Yard | Corridor |
|---|---|---|---|---|---|
| Vendor/model: | NICE NVE1008 | Arecont 2105 | NICE NVE1008 | AXIS P3301 | NICE NVE1008 |
| Resolution: | CIF | 2 MP | CIF | VGA | 4 CIF |
| Saving (percent) | 8% | 50% | 16% | 26% | 40% |

In accordance with an embodiment of the invention, a computer program application stored in non-volatile memory, or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for real time bit rate reduction in compressed video streams.

The non-volatile memory and/or computer-readable medium may be a non-transitory computer-readable medium including all forms and types of memory and all computer-readable media except for a transitory, propagating signal.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. An apparatus for further compressing a compressed video having a plurality of groups of pictures, each group of pictures including at least one INTRA frame and a plurality of INTER frames, the apparatus comprising:
   a memory; and
   a processor configured to:
      receive the compressed video stream;
      for each INTER frame:
      perform entropy decoding to reveal motion vectors and bit sizes of encoded macro blocks from the compressed video stream;
      perform a skip macro block compression based on the motion vectors and on the bit sizes of macro blocks, wherein the skip macro block compression comprises deleting, from the compressed video stream, an encoded macro block and replacing the encoded macro block with a macro block marked as skipped if the following conditions are met:
         the encoded macro block is an INTER macro block;
         the encoded macro block has a motion vector less than a predetermined threshold;
         the encoded macro block is not near a macro block with motion;
         the encoded macro block bit size is less than a predetermined macro block size threshold; and
         macro blocks in one or more frames of previous groups of pictures, that have a positional correspondence with the encoded macro block, have no motion;
      perform entropy encoding on the INTER frame; and
      combine the INTER frame to an output bit stream.

2. The apparatus of claim 1, the processor further configured to place the compressed frame in a position within the group of pictures corresponding to an original position of the at least one INTER frame.

3. The apparatus of claim 1, wherein the processor is configured to save an INTRA macro block to the output bit stream.

4. The apparatus of claim 1, the processor further configured to apply a morphological dilation operation to extend an area marked as including motion within the INTER frame.

5. The apparatus of claim 1, wherein the processor is located in one of an image capture device, a network device, and a recorder.

6. A method for of further compressing a compressed video having a plurality of groups of pictures, each group of pictures including at least one INTRA frame and a plurality of INTER frames, the method comprising:

receiving the compressed video stream;
for each INTER frame:
performing entropy decoding to reveal motion vectors and bit sizes of encoded macro blocks from the compressed video stream;
performing a skip macro block compression based on the motion vectors and on the bit sizes of macro blocks, wherein the skip macro block compression comprises deleting, from the compressed video stream, an encoded macro block and replacing the encoded macro block with a macro block marked as skipped if the following conditions are met:
the encoded macro block is an INTER macro block;
the encoded macro block has a motion vector less than a predetermined threshold;
the encoded macro block is not near a macro block with motion;
the encoded macro block bit size is less than a predetermined macro block size threshold; and
macro blocks in one or more frames of previous groups of pictures, that have a positional correspondence with the encoded macro block, have no motion;
performing entropy encoding on the INTER frame; and
combining the INTER frame to an output bit stream.

7. The method of claim 6, further comprising saving an INTRA macro block to the output bit stream.

8. The method of claim 6, wherein the predetermined macro block size threshold is one of 0 bits, 100 bits, 400 bits, and 500 bits.

9. The method of claim 6, wherein the predetermined motion vector threshold is one of 0 pixels and 0.5 pixel.

10. The method of claim 6, further including applying a morphological dilation operation to extend an area marked as including motion in the INTER frame.

11. A non-transitory computer readable medium having stored thereon instructions which when executed by a processor cause the processor to perform the method of further compressing a compressed video having a plurality of groups of pictures, each group of pictures including at least one INTRA frame and a plurality of INTER frames, the method comprising:
receiving the compressed video stream;
for each INTER frame:
performing entropy decoding to reveal motion vectors and bit sizes of encoded macro blocks from the compressed video stream;
performing a skip macro block compression based on the motion vectors and on the bit sizes of macro blocks, wherein the skip macro block compression comprises deleting, from the compressed video stream, an encoded macro block and replacing the encoded macro block with a macro block marked as skipped if the following conditions are met:
the encoded macro block is an INTER macro block;
the encoded macro block has a motion vector less than a predetermined threshold;
the encoded macro block is not near a macro block with motion;
the encoded macro block bit size is less than a predetermined macro block size threshold; and
macro blocks in one or more frames of previous groups of pictures, that have a positional correspondence with the encoded macro block, have no motion;
performing entropy encoding on the INTER frame; and
combining the INTER frame to an output bit stream.

12. The non-transitory computer readable medium of claim 11, the instructions including:
saving an INTRA macro block.

13. The non-transitory computer readable medium of claim 11, the instructions including:
wherein the predetermined macro block size threshold is one of 0 bits, 100 bits, 400 bits, and 500 bits.

14. The non-transitory computer readable medium of claim 11, the instructions including:
wherein the predetermined motion vector threshold is one of 0 pixels and 0.5 pixel.

15. The non-transitory computer readable medium of claim 11, the instructions including:
applying a morphological dilation operation to extend an area marked as motion in the INTER frame.

* * * * *